Sept. 30, 1924.
G. W. FRY
PNEUMATIC CHUCK
Filed Dec. 17, 1923
1,509,997
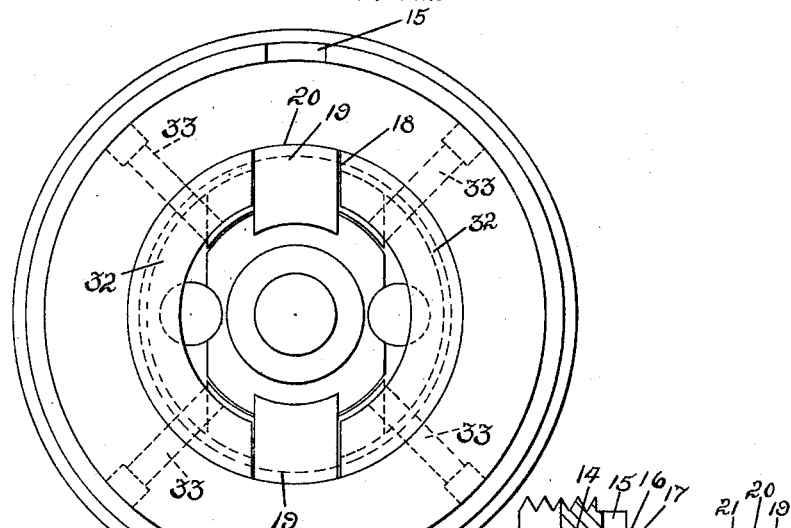
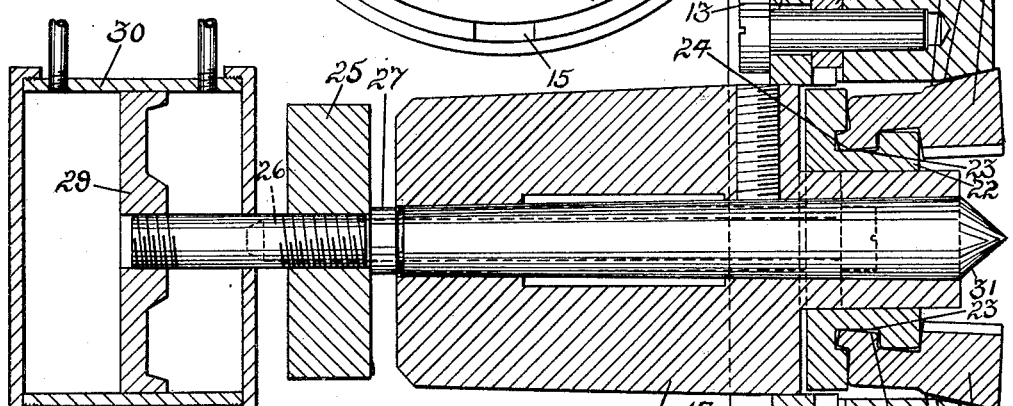
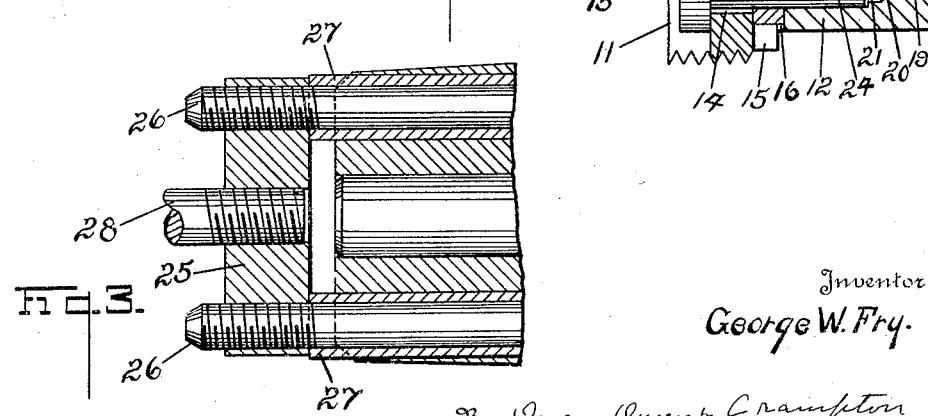
Inventor
George W. Fry.
By Owen, Owen & Crampton
Attorneys Patented Sept. 30, 1924.

1,509,997

UNITED STATES PATENT OFFICE.

GEORGE W. FRY, OF TOLEDO, OHIO.

PNEUMATIC CHUCK.

Application filed December 17, 1923. Serial No. 681,220.

*To all whom it may concern:*

Be it known that I, GEORGE W. FRY, a citizen of the United States, and a resident of Toledo, in the county of Lucas and State of Ohio, have invented a new and useful Pneumatic Chuck, which invention is fully set forth in the following specification.

My invention relates to a chuck and more particularly to a pneumatic chuck for lathes.

The purpose of my invention is to provide a chuck which will operate quickly, efficiently and accurately, regardless of slight irregularities in the jaw-contacting surface of the article.

In the accompanying drawings, Figure 1 is a longitudinal section of a chuck embodying my invention, Figure 2 is a face view of the same and Figure 3 is a detail view.

The head 10 carries a flange ring 11. A floating ring 12 is fastened to the flange 11 by means of bolts 13. These bolts pass through holes 14 in flange 11, which holes are larger than the bolts so as to allow play. Keyways 15 and 16 are provided in the contacting faces of the flange 11 and ring 12 and keys 17 in these keyways prevent ring 12 from rotation with respect to the flange while allowing it movement laterally of its axis. The floating ring 12 has grooves 18 in its inner side, and jaws 19 fit loosely within these grooves so that they may move to a slight extent laterally of the grooves. The inner surfaces 20 of the slots 18 are beveled and contact the correspondingly beveled surfaces 21 of the jaws so that relative longitudinal movement of the jaws and ring will open or close the jaws.

A jaw-operating ring 22 slides within the ring 12 and has a groove 23 to receive lugs 24 of the jaws 19 so that axial movement of the ring 22 is transmitted to the jaws. A cross head 25 is connected to the ring 22 by bolts 26 which pass through the head 10 and each of which is surrounded by a spacing sleeve 27. The cross head 25 is operated by the rod 28 of a piston 29 within a pneumatic cylinder 30. The head 10 carries a centering pin 31 between the chuck jaws.

I prefer to form the ring 12 with a continuous inner surface 20 and form the slots 18 by means of segments 32 which are held in position by bolts 33. The use of these segments is useful in the original construction of the ring and makes possible the use of jaws of different widths by merely changing the segments so as to leave the slots of the desired width.

The operation of my chuck is as follows:

The article to be operated upon is properly centered on the centering pin 31 between the jaws 19, whereupon the pneumatic cylinder is connected to a source of compressed air so as to drive the piston 29 to the left, drawing the jaws 19 to the left and closing them by reason of the wedging surfaces 20 and 21. The enlarged bolt holes 14 allow the ring 12 to move with respect to the flange 11, but the keys 17 confine this movement to one diameter. This allows the jaws to close upon the article even if one side of the article is slightly thicker than the other side. The lateral play of the jaws in the slots 18 allows the jaws to move laterally to accommodate any slight irregularity in the article which may require such movement. In this way, the article is firmly gripped in the chuck in the exact position indicated by its relation to the centering pin 31, regardless of slight irregularities in the jaw-contacted surface of the article.

The essential features of this chuck are the floating ring and lateral play of the jaws, which allow the jaws to properly grip a slightly irregular article without disturbing its relation to the centering pin.

Various changes may be made in the relation of the parts and the structure of the jaws and the jaw-operating means, and while I prefer a pneumatic cylinder for operating the jaws, other means might be used for that purpose. Therefore, I do not wish to confine my invention to the structure shown beyond the terms of the appended claims.

What I claim is:—

1. In a chuck, a ring floating radially of the chuck and having beveled surfaces, jaws having beveled surfaces adapted to cooperate with the beveled surfaces of the ring, and means to produce relative movement between the ring and jaws longitudinally of the chuck.

2. In a chuck, a centering pin, jaws adapted to close upon an article centered upon the pin and having beveled outer faces, and a floating ring having beveled inner surfaces adapted to cooperate with the outer surfaces of the jaws.

3. In a chuck, a centering pin, two jaws adapted to close upon opposite sides of an article centered upon the pin, a ring having slideways in its inner surface adapted to receive the jaws, and means connecting the pin and the ring, said connecting means allowing movement of the ring along the line passing through the center of the pin and the two jaws.

4. In a chuck, a centering pin, two jaws adapted to close upon opposite sides of an article centered upon the pin, a ring having slideways in its inner surface adapted to receive the jaws, and means connecting the pin and the ring, said connecting means allowing movement of the ring along the line passing through the center of the pin and the two jaws, said slots allowing limited lateral movement of the jaws.

5. In a chuck, a centering pin, two jaws adapted to close upon opposite sides of an article centered upon the pin, a ring having slideways in its inner surface adapted to receive the jaws, means connecting the pin and the ring, said connecting means allowing movement of the ring along the line passing through the center of the pin and the two jaws, and means including a pneumatic cylinder for moving the jaws longitudinally of the pin.

6. In a chuck, a jaw-enclosing ring having a continuous inner beveled surface and segments removably attached to the inner surface of the ring and leaving between their ends slideways for jaws.

In testimony whereof, I have hereunto signed my name to this application.

GEORGE W. FRY.